J. Hunter,
Wool-Washing Machine,
No. 41,705.   Patented Feb. 23, 1864.
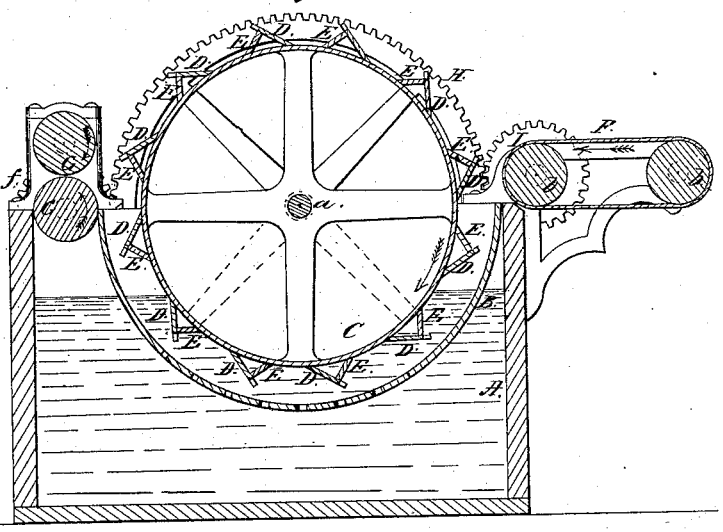
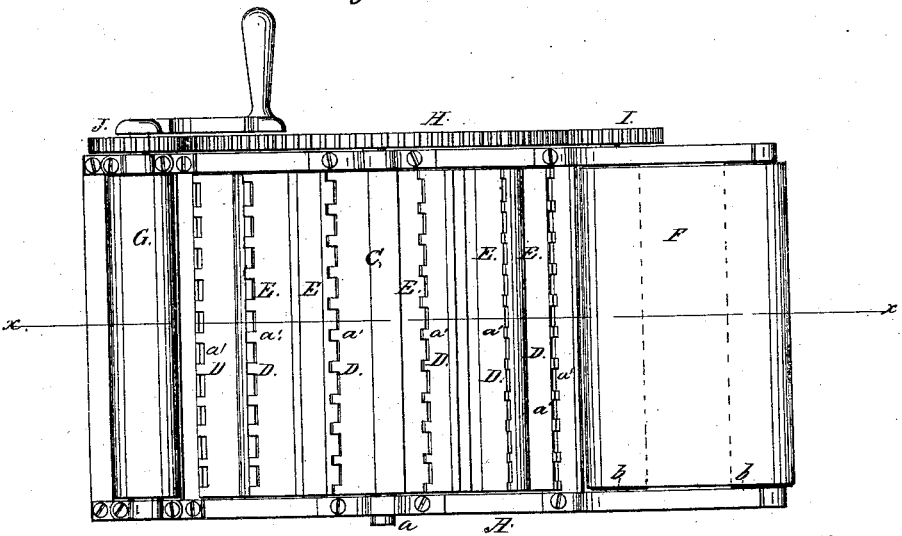

UNITED STATES PATENT OFFICE.

JAMES HUNTER, OF NORTH ADAMS, MASSACHUSETTS.

IMPROVEMENT IN MACHINES FOR WASHING WOOL, &c.

Specification forming part of Letters Patent No. 41,705, dated February 23, 1864.

*To all whom it may concern:*

Be it known that I, JAMES HUNTER, of North Adams, in the county of Berkshire and State of Massachusetts, have invented a new and useful Machine for Washing Wool and other Fibrous Substances; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a plan or top view of the same.

Similar letters of reference indicate corresponding parts in the two figures.

This invention consists in the employment or use of a cylinder provided with floats or blades and fitted within a box or tank containing scouring liquid or water, and having a perforated concave placed within it, all being constructed and arranged in such a manner, and with a feed-apron and discharging pressure-roller, that the wool or other substance will, as the cylinder rotates, be taken by the floats or blades from the feed-apron and carried through the scouring liquid or water over the concave, where it is washed and then delivered to the pressure-rollers, which express the moisture from the wool or other substance, as they discharge it from the machine.

To enable those skilled in the art to fully understand and construct my invention, I will proceed to describe it.

A represents a box or tank of any suitable dimensions, and having secured within it a concave, B, of semicircular form. This concave is perforated, and may be constructed of sheet metal. The box or tank may be of wood.

C is a cylinder, which may be of cast-iron. The shaft $a$ of this cylinder has its bearings on the sides of the tank or box, and the cylinder is fitted so as to work in the concave B, and have a concentric position relatively with it. A considerable space is allowed between the periphery of the cylinder C and the concave B, the cylinder and concave being of such dimensions as to admit of this, and the periphery of the cylinder has a series of floats or blades, D, attached to it in an oblique position, as shown clearly in Fig. 1, the edges of said floats or blades being notched or serrated, as shown at $a'$. The floats or blades D are braced and retained in proper position by plates E.

The notched or serrated edges of the floats or blades D do not touch the concave B, a space being allowed between them.

F represents an endless apron which works horizontally over two rollers, $b\,b$, placed at one end of the box or tank A at its upper part; and G G represent two pressure-rollers which are placed at the opposite end of the box or tank, said rollers G being one directly over the other and in the same axial frame.

On one end of the shaft $a$ of the cylinder C there is a spur-wheel, H, into which a pinion, I, on the shaft of the inner roller, $b$, of the apron F gears, and a similar pinion, J, which is on the shaft of the lower pressure-roller, G, also gears into said spur-wheel H.

The operation is as follows: The lower roller, G, is rotated by any convenient power, and motion is communicated to the cylinder C and apron F in the direction indicated by the arrows through the medium of the gearing just described. The wool or other substance to be washed is placed upon the apron F, which conveys it to the cylinder C, and the floats or blades D carry the wool or other substance down over the face of the concave B, and through the scouring-liquid with which the box or tank A is supplied. The wool or other substance is washed or cleaned by this treatment, and the floats or blades convey it to the rollers G G, through which it is discharged from the machine, and has the moisture expressed from it at the same time.

The oblique position of the floats or blades D insures the delivery of the wool or other substance from the floats or blades to the pressure-rollers. If the former had a radial position on the cylinder C, they would, if a stripping device of some kind were not employed, be liable to carry up the wool or other substance past the rollers G and around again over the concave, but by having the floats placed obliquely on the cylinder the wool or other substance will readily fall into the "bite" of the rollers G as the floats or blades pass up by them, and no special device is required for discharging the wool from the cylinder. By having the edges of the floats or blades serrated or notched the wool or other substance is prevented from being wedged in between the concave and the floats or blades I would remark that in practice several of these machines may be used and their gearing connected so that they may all work simultaneously, the wool or other substance being discharged by the rollers G of one machine upon the feed-apron F of the succeeding one, the last machine having its box or tank supplied with water to rinse the wool or other substance. I would further remark that the speed of the cylinder C and pressure-rollers G should be such relatively with the apron F as to insure the wool or other substance being carried through the machine without the liability of its becoming choked or clogged therein.

Having thus described my invention, what I claim as new, and desire to secure by Letters Patent, is—

1. The cylinder C, provided with floats D, having an oblique position, in combination with the concave B and the box or tank A, for the purpose set forth.

2. The combination of the feed-apron F, cylinder C, provided with floats D, and the discharge pressure-rollers G G, all arranged for joint operation, substantially as herein described.

JAMES HUNTER.

Witnesses:
JAMES E. HUNTER,
GEORGE W. CHASE.